US011318546B2

(12) United States Patent
Taylor et al.

(10) Patent No.: US 11,318,546 B2
(45) Date of Patent: May 3, 2022

(54) FLYING PUNCH AND CUTOFF MACHINE WITH ROLLER RACK AND PINION AND METHOD OF USING SAME

(71) Applicant: TEKFAB, Inc., Albany, OR (US)

(72) Inventors: Robert Brooks Taylor, Jefferson, OR (US); Aaron David Roth, Scio, OR (US)

(73) Assignee: TEKFAB, Inc., Albany, OR (US)

( * ) Notice: Subject to any disclaimer, the term of this patent is extended or adjusted under 35 U.S.C. 154(b) by 0 days.

(21) Appl. No.: 17/316,488

(22) Filed: May 10, 2021

(65) Prior Publication Data
US 2021/0402493 A1  Dec. 30, 2021

Related U.S. Application Data

(60) Provisional application No. 63/043,541, filed on Jun. 24, 2020.

(51) Int. Cl.
*B23D 25/04* (2006.01)
*B26D 1/60* (2006.01)

(52) U.S. Cl.
CPC .............. *B23D 25/04* (2013.01); *B26D 1/60* (2013.01)

(58) Field of Classification Search
CPC ...... B23Q 9/0014; B23Q 1/48; B23D 45/021; B23D 47/042; B23D 59/008; B23D 45/12; B23D 45/10; B23D 45/20; B27B 1/002; B27B 31/06; B27B 5/185; B27B 29/02; B27B 31/08; B27B 5/208; B23B 29/00
USPC ......... 83/284, 487, 483–485, 743, 930, 359, 83/360, 75.5, 102, 109, 76.1, 486.1
See application file for complete search history.

(56) References Cited

U.S. PATENT DOCUMENTS

| 3,926,086 A * | 12/1975 | Crane ................... B27B 17/005 83/801 |
| 4,382,728 A * | 5/1983 | Anderson ............... B23C 1/002 144/135.2 |
| 5,033,347 A * | 7/1991 | Hillestad .............. B23Q 9/0014 83/487 |

(Continued)

FOREIGN PATENT DOCUMENTS

JP          04135116 A  *  5/1992  ............. B23D 45/12

OTHER PUBLICATIONS

Translated Description of JP 04135116 A from ESPACENET (Year: 1992).*

*Primary Examiner* — Ghassem Alie
(74) *Attorney, Agent, or Firm* — Procopio Cory Hargreaves and Savitch LLP

(57) ABSTRACT

A flying punch and cutoff machine that performs an operation on a moving item that moves at a line speed includes a support assembly; a carriage assembly movably supported by the support assembly; a tooling assembly supported by the carriage assembly, the tooling assembly including a tool to perform an operation on the moving item; a roller rack and pinion mechanism supported by the support assembly and configured to impart motion to the carriage assembly; and a controller configured to control the roller rack and pinion mechanism so that a line speed of the carriage assembly and tool matches the line speed of the moving item so that the operation is performed on the moving item with that no relative motion occurring between the moving item and the tool.

12 Claims, 5 Drawing Sheets

(56) References Cited

U.S. PATENT DOCUMENTS 5,365,812 A * 11/1994 Hamden .............. B23D 47/042
700/167
9,669,844 B2 * 6/2017 Niizuma ................. E04H 6/422

* cited by examiner

FLYING PUNCH AND CUTOFF MACHINE WITH ROLLER RACK AND PINION AND METHOD OF USING SAME

FIELD OF THE INVENTION

The present invention relates to flying punch and cutoff machines, and methods.

BACKGROUND OF THE INVENTION

Flying punch and cutoff machines have used various mechanisms and method to accelerate/decelerate a carriage with tooling to match the line speed of a material or part being work on, but have suffered from the following disadvantages: belt driven systems offered high speed, but could not operate with large masses at high accuracy; standard rack and pinion systems offered high accuracy and high speed but required frequent backlash adjustment and had to operate in an oil bath for long life; and ball screw driven systems offered high accuracy and long life but could not operate at high speed (ball screw driven systems also suffer from a catastrophic failure issue when overloaded).

SUMMARY OF THE INVENTION

An aspect of the invention involves a flying punch and cutoff machine that performs an operation on a moving item that moves at a line speed, comprising: a support assembly; a carriage assembly movably supported by the support assembly; a tooling assembly supported by the carriage assembly, the tooling assembly including a tool to perform an operation on the moving item; a roller rack and pinion mechanism supported by the support assembly and configured to impart motion to the carriage assembly; and a controller configured to control the roller rack and pinion mechanism so that a line speed of the carriage assembly and tool matches the line speed of the moving item so that the operation is performed on the moving item with that no relative motion occurring between the moving item and the tool.

One more implementations of the aspect of the invention described immediately above includes one or more of the following: the controller is configured to control the roller rack and pinion mechanism so that once the operation is performed on the moving item, the carriage assembly is decelerated and moved back to a home position to await further operation; the controller is configured to control the roller rack and pinion mechanism to accelerate masses of greater than 2500 lb; and/or the controller is configured to control the roller rack and pinion mechanism to operate at a tolerance of less than +/−0.063".

Another aspect of the invention involves a method of using a roller rack and pinion mechanism in a flying punch and cutoff machine that performs an operation on a moving item that moves at a line speed, the flying punch and cutoff machine including a support assembly; a carriage assembly movably supported by the support assembly; a tooling assembly supported by the carriage assembly, the tooling assembly including a tool to perform an operation on the moving item, comprising: providing the roller rack and pinion mechanism with the flying punch and cutoff machine; imparting motion to the carriage assembly via the roller rack and pinion mechanism so that a line speed of the carriage assembly and tool matches the line speed of the moving item so that the operation is performed on the moving item with that no relative motion occurring between the moving item and the tool.

One more implementations of the aspect of the invention described immediately above includes one or more of the following: imparting includes imparting motion to the carriage assembly via the roller rack and pinion mechanism so that once the operation is performed on the moving item, the carriage assembly is decelerated and moved back to a home position to await further operation; imparting includes imparting motion to the carriage assembly via the roller rack and pinion mechanism so that the roller rack and pinion mechanism accelerates masses of greater than 2500 lb; imparting includes imparting motion to the carriage assembly via the roller rack and pinion mechanism so that the roller rack and pinion mechanism operates at a tolerance of less than +/−0.015".

A further aspect of the invention involves a roller rack and pinion mechanism of a flying punch and cutoff machine that performs an operation on a moving item that moves at a line speed, the flying punch and cutoff machine including a support assembly; a carriage assembly movably supported by the support assembly; a tooling assembly supported by the carriage assembly, the tooling assembly including a tool to perform an operation on the moving item, comprising: a rack coupleable to the carriage assembly; and a roller pinion operatively coupleable to the rack to impart motion to the carriage assembly via the rack so that a line speed of the carriage assembly and tool matches the line speed of the moving item so that the operation is performed on the moving item with that no relative motion occurring between the moving item and the tool.

One more implementations of the aspect of the invention described immediately above includes one or more of the following: a controller configured to control the roller rack and pinion mechanism so that once the operation is performed on the moving item, the carriage assembly is decelerated and moved back to a home position to await further operation; a controller configured to control the roller rack and pinion mechanism to accelerate masses of greater than 2500 lb; and/or a controller configured to control the roller rack and pinion mechanism to operate at a tolerance of less than +/−0.015".

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
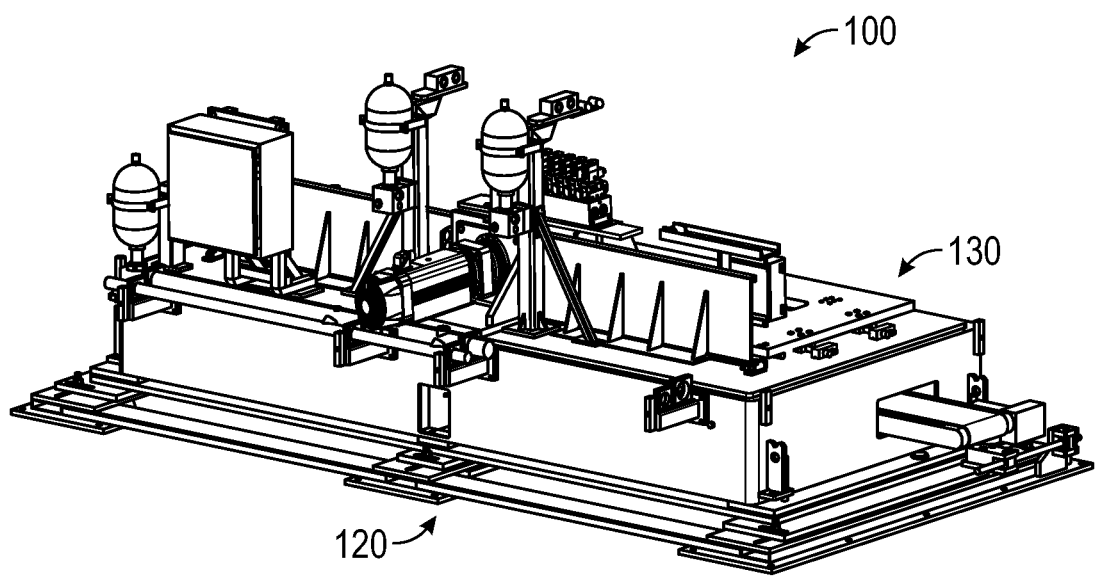
FIG. 1 is a rear perspective view of an embodiment of a flying punch and cutoff machine.
Figure 2:
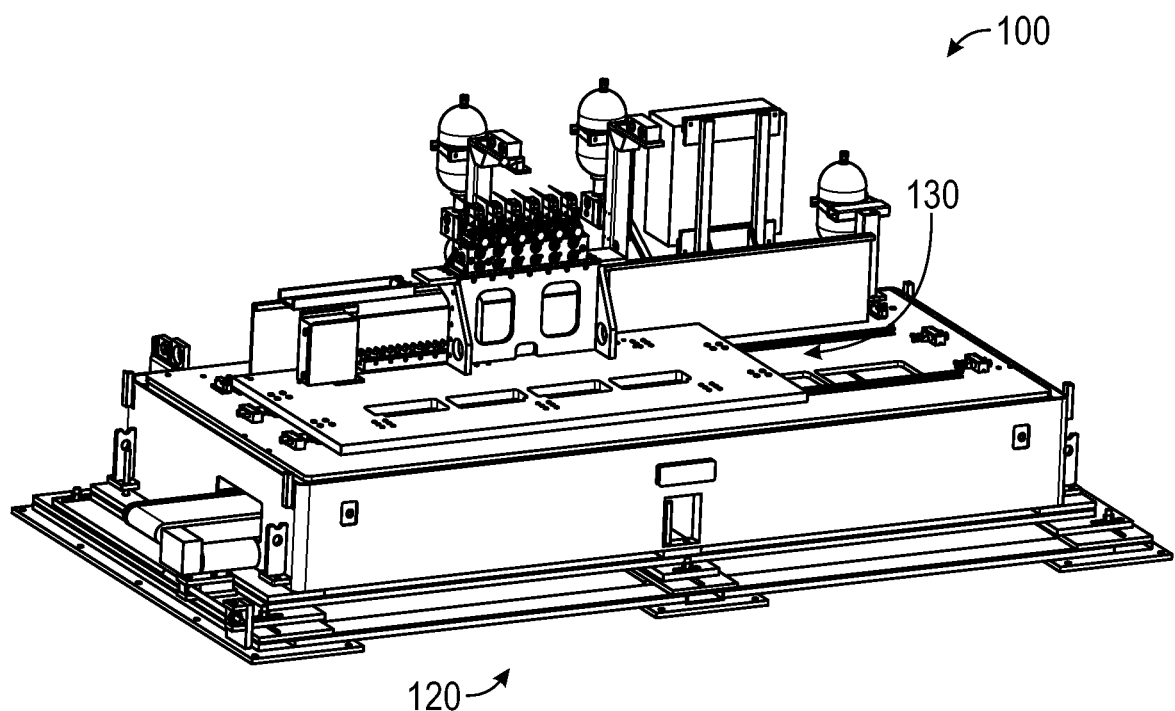
FIG. 2 is a front perspective view of the flying punch and cutoff machine of FIG. 1.
Figure 3:
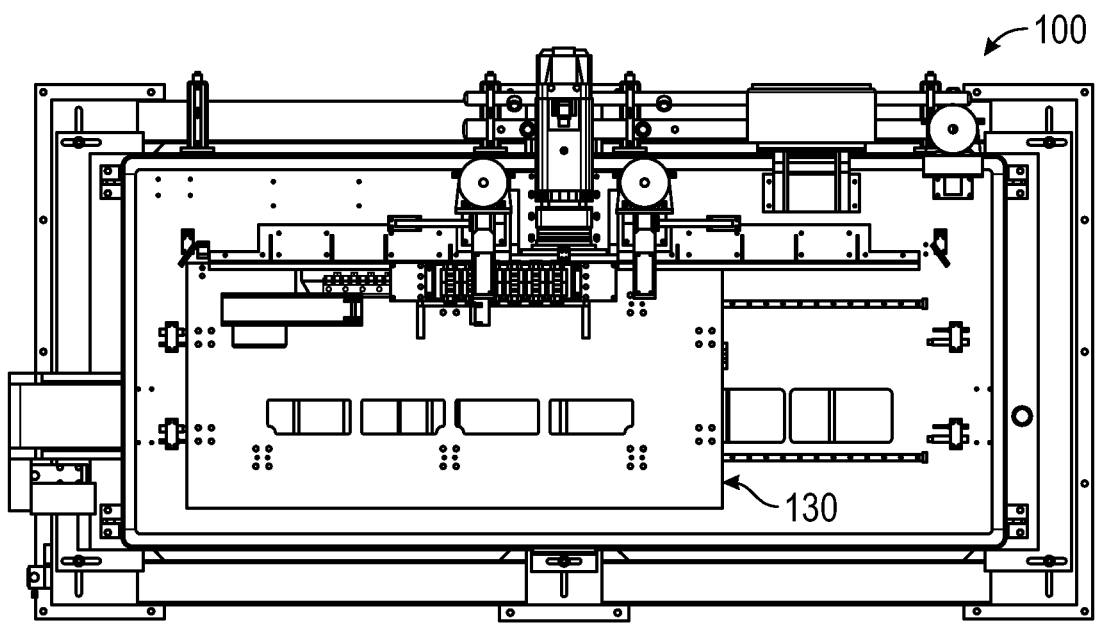
FIG. 3 is a top plan view of the flying punch and cutoff machine of FIG. 1.
Figure 4:
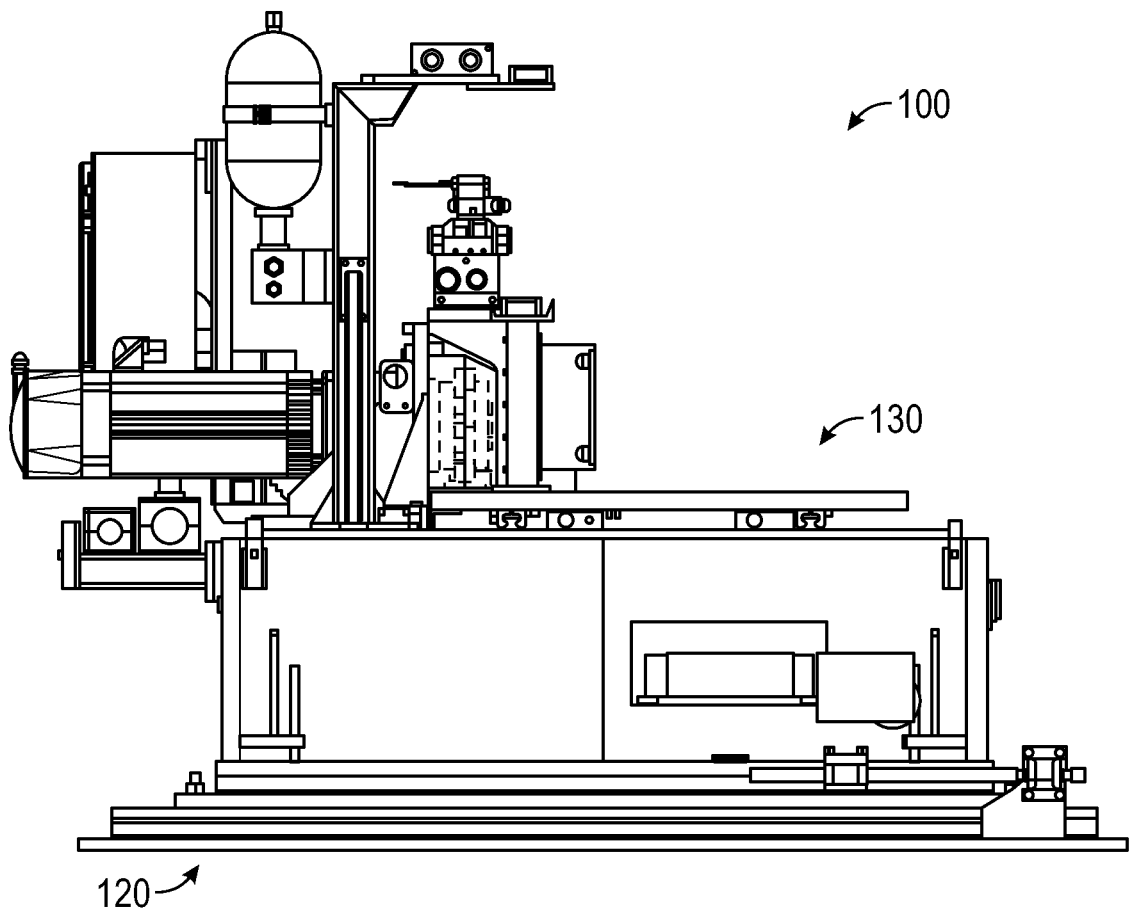
FIG. 4 is a rear elevational view of the flying punch and cutoff machine of FIG. 1.
Figure 5:
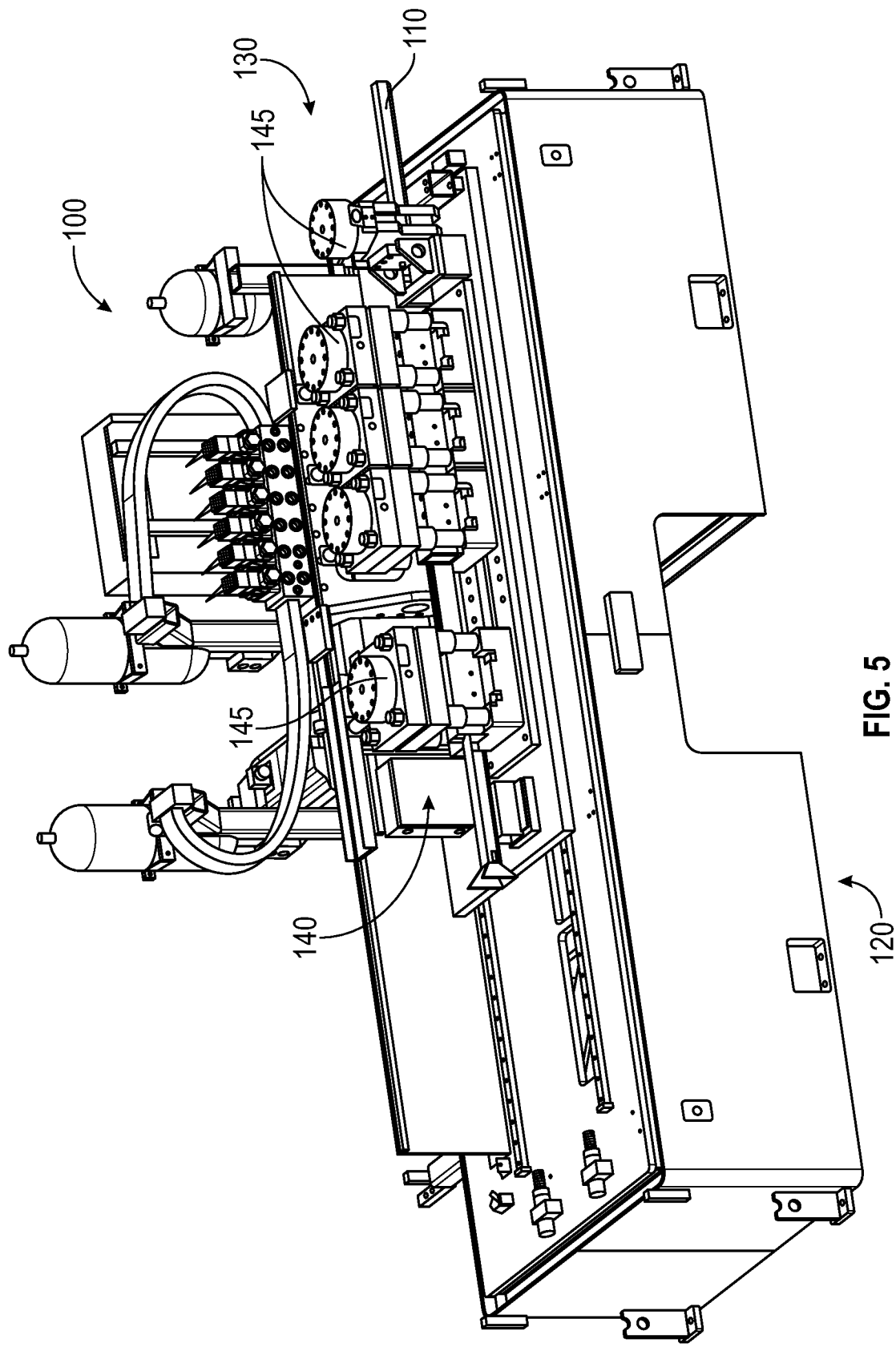
FIG. 5 is a rear perspective view of the flying punch and cutoff machine of FIG. 1 and additionally shows punch and shear tooling, and a material strip.
Figure 6:
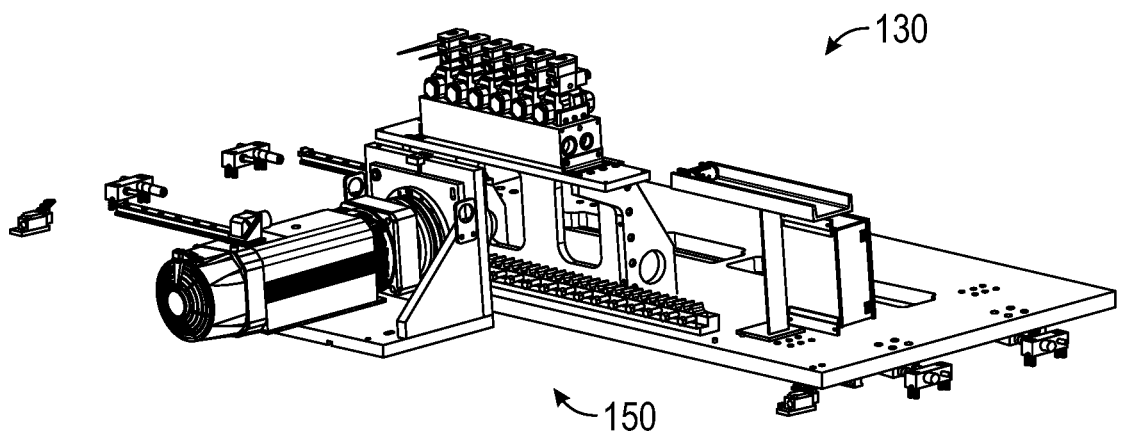
FIG. 6 is a rear perspective view of a carriage of the flying punch and cutoff machine of FIG. 1.
Figure 7:
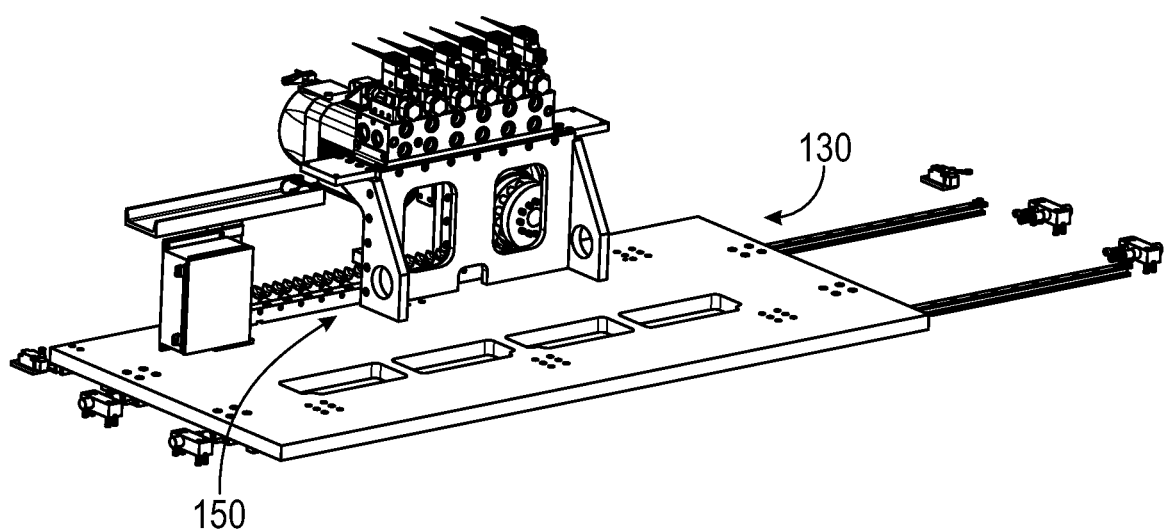
FIG. 7 is a front perspective view of the carriage of FIG. 6.
Figure 8:
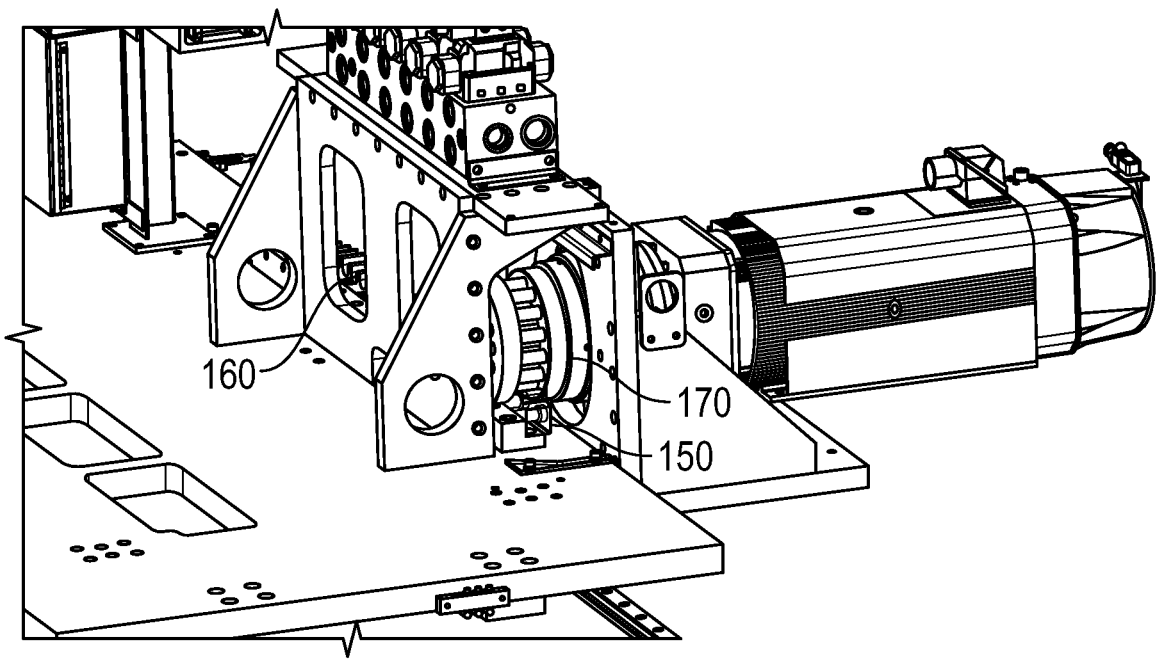
FIG. 8 is a perspective view of an embodiment of a roller rack and pinion assembly used with the carriage of the flying punch and cutoff machine of FIG. 1.

With reference to FIGS. 1-9, an embodiment of a flying punch and cutoff machine ("machine") 100 and method will be described. The machine 100 punches or shears a moving part/material/material strip 110.

The machine 100 includes a support assembly 120, a carriage assembly or carriage 130, a tooling assembly 140 including punching and/or shearing tools 145 mounted on the carriage 130, and a roller rack and pinion mechanism 150 including a rack 160 and a roller pinion 170.

The roller rack and pinion mechanism 150 drives/accelerates the motion of the carriage 130, which the punches and/or shearing tools 145 of the tooling assembly 140 are mounted onto, to a line speed of the part 110 so that work (punch and/or shear a continuously moving strip of metal or other material 110) can be performed on the part 110 as the part 110 moves through the machine 100 so that no relative motion occurs between the strip 110 and tools 145. Once the punching/shearing has occurred, the carriage 130 will decelerate and move back to a home position and await the next operation.

The roller rack and pinion mechanism 150 tremendously increases the performance of the machine 100 compared to the belt driven systems, standard rack and pinion systems, and ball screw driven systems in the past. With the roller rack and pinion mechanism 150, the machine 100 can now accelerate much larger masses (greater than 2500 lb in first embodiment, greater than 3500 lb in a second embodiment, greater than 4500 lb in a third embodiment, greater than 5500 lb in a fourth embodiment) than has been possible in the past. The machine 100 can operate at high speeds (up to 400+ feet per minute strip speed). The roller rack and pinion mechanism 150 operates at a tolerance of +/−0.015" or less (e.g., +/−0.010" precision) due to very low backlash in the machine. In a first embodiment, the roller rack and pinion mechanism 150 operates at a tolerance of less than +/−0.063". In a second embodiment, the roller rack and pinion mechanism 150 operates at a tolerance of less than +/−0.040". In a third embodiment, the roller rack and pinion mechanism 150 operates at a tolerance of less than +/−0.025". In a fourth embodiment, the roller rack and pinion mechanism 150 operates at a tolerance of less than +/−0.015". The roller rack and pinion mechanism 150 has high accuracy due to very high stiffness of the design and preload (no backlash) between the rack 160 and the roller pinion 170. The roller rack and pinion mechanism 150 has great wear characteristics over time due to rolling contact between he rack 160 and the roller pinion 170, does not require adjustment to maintain accuracy. The machine 100 has a long life without adjustment or wear and is extremely robust.

Figure 9:
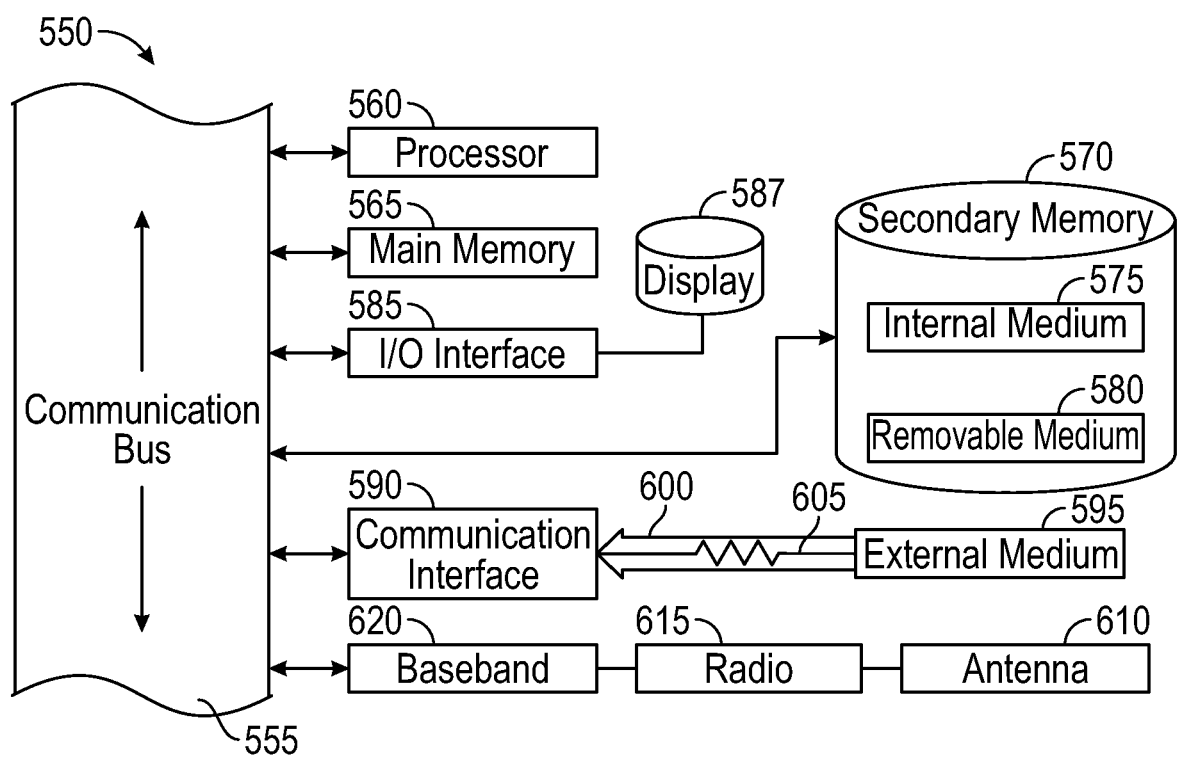
FIG. 9 is a block diagram illustrating an example wired or wireless processor enabled device that may be used in connection with various embodiments described herein.

FIG. 9 is a block diagram illustrating an example wired or wireless system 550 that may be used in connection with various embodiments described herein. For example the system 550 may be used as or in conjunction with the computer-controlled system and computer control shown and/or described herein with respect to the flying punch and cutoff machine 100. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display 587. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A method of using a roller rack and pinion mechanism in a flying punch and cutoff machine that performs an operation on a moving item that moves at a line speed, the flying punch and cutoff machine including a support assembly; a carriage assembly movably supported by the support assembly; a tooling assembly supported by the carriage assembly, the tooling assembly including a tool to perform an operation on the moving item, comprising:
  providing the roller rack and pinion mechanism with the flying punch and cutoff machine, the roller rack and pinion mechanism including a rack with a plurality of teeth with side walls, and a pinion with two side walls that overlap the side walls of the teeth, wherein the pinion includes a plurality of roller members circumferentially spaced between the two side walls and the rack includes a plurality of roller member receiving segments between the teeth; imparting motion to the carriage assembly;
  via the roller rack and pinion mechanism so that a line speed of the carriage assembly and tool matches the line speed of the moving item so that the operation is performed on the moving item with that no relative motion occurring between the moving item and the tool.

2. The method of claim 1, wherein imparting includes imparting motion to the carriage assembly via the roller rack and pinion mechanism so that once the operation is performed on the moving item, the carriage assembly is decelerated and moved back to a home position to await further operation.

3. The method of claim 1, wherein imparting includes imparting motion to the carriage assembly via the roller rack and pinion mechanism so that the roller rack and pinion mechanism accelerates masses of greater than 2500 lb.

4. The method of claim 1, wherein imparting includes imparting motion to the carriage assembly via the roller rack and pinion mechanism so that the roller rack and pinion mechanism operates at a tolerance of less than +/−0.063".

5. A flying punch and cutoff machine that performs an operation on a moving item that moves at a line speed, comprising:
   a support assembly;
   a carriage assembly movably supported by the support assembly;
   a tooling assembly supported by the carriage assembly, the tooling assembly including a tool to perform an operation on the moving item;
   a roller rack and pinion mechanism supported by the support assembly and configured to impart motion to the carriage assembly, the roller rack and pinion mechanism including a rack with a plurality of teeth with side walls, and a pinion with two side walls that overlap the side walls of the teeth, wherein the pinion includes a plurality of roller members circumferentially spaced between the two side walls and the rack includes a plurality of roller member receiving segments between the teeth; a controller configured to control the roller rack and pinion mechanism
   a line speed of the carriage assembly and tool matches the line speed of the moving item so that the operation is performed on the moving item with that no relative motion occurring between the moving item and the tool.

6. The flying punch and cutoff machine of claim 5, wherein the controller is configured to control the roller rack and pinion mechanism so that once the operation is performed on the moving item, the carriage assembly is decelerated and moved back to a home position to await further operation.

7. The flying punch and cutoff machine of claim 5, wherein the controller is configured to control the roller rack and pinion mechanism to accelerate masses of greater than 2500 lb.

8. The flying punch and cutoff machine of claim 7, wherein the controller is configured to control the roller rack and pinion mechanism to operate at a tolerance of less than +/−0.063".

9. A roller rack and pinion mechanism of a flying punch and cutoff machine that performs an operation on a moving item that moves at a line speed, the flying punch and cutoff machine including a support assembly; a carriage assembly movably supported by the support assembly; a tooling assembly supported by the carriage assembly, the tooling assembly including a tool to perform an operation on the moving item, comprising:
   a rack coupleable to the carriage assembly;
   a roller pinion operatively coupleable to the rack to impart motion to the carriage assembly via the rack so that a line speed of the carriage assembly and tool matches the line speed of the moving item so that the operation is performed on the moving item with that no relative motion occurring between the moving item and the tool,
   wherein the roller rack and pinion mechanism includes the rack with a plurality of teeth with side walls, and the roller pinion with two side walls that overlap the side walls of the teeth, wherein the roller pinion includes a plurality of roller members circumferentially spaced between the two side walls and the rack includes a plurality of roller member receiving segments between the teeth.

10. The roller rack and pinion mechanism of claim 9, further including a controller configured to control the roller rack and pinion mechanism so that once the operation is performed on the moving item, the carriage assembly is decelerated and moved back to a home position to await further operation.

11. The roller rack and pinion mechanism of claim 9, further including a controller configured to control the roller rack and pinion mechanism to accelerate masses of greater than 2500 lb.

12. The roller rack and pinion mechanism of claim 9, further including a controller configured to control the roller rack and pinion mechanism to operate at a tolerances of less than +/−0.063".

* * * * *